United States Patent
Salter et al.

(10) Patent No.: US 12,154,329 B1
(45) Date of Patent: Nov. 26, 2024

(54) METHOD AND DEVICE FOR DISPLAYING A TASK LIST

(71) Applicant: Apple Inc., Cupertino, CA (US)

(72) Inventors: Thomas G. Salter, Foster City, CA (US); Devin William Chalmers, Oakland, CA (US); Gregory Patrick Lane Lutter, Bolder Creek, CA (US); Bart Colin Trzynadlowski, Reno, NV (US); Rahul Nair, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 23 days.

(21) Appl. No.: 17/387,461

(22) Filed: Jul. 28, 2021

Related U.S. Application Data

(60) Provisional application No. 63/058,931, filed on Jul. 30, 2020.

(51) Int. Cl.
  *G06V 20/20* (2022.01)
  *G06F 3/0482* (2013.01)
  *G06T 19/00* (2011.01)
  *G06V 40/20* (2022.01)

(52) U.S. Cl.
  CPC ............ *G06V 20/20* (2022.01); *G06F 3/0482* (2013.01); *G06T 19/006* (2013.01); *G06V 40/20* (2022.01)

(58) Field of Classification Search
  CPC ...... G06V 20/20; G06V 40/20; G06F 3/0482; G06T 19/006
  See application file for complete search history.

(56) References Cited

U.S. PATENT DOCUMENTS

| | | | |
|---|---|---|---|
| 6,505,256 B1 * | 1/2003 | York | G06T 11/001 |
| | | | 709/248 |
| 9,552,596 B2 | 1/2017 | Waldman et al. | |
| 2012/0249741 A1 * | 10/2012 | Maciocci | G06T 19/006 |
| | | | 348/51 |

(Continued)

FOREIGN PATENT DOCUMENTS

WO  2015130150 A1  9/2015

OTHER PUBLICATIONS

Wikipedia, "Checklist", published at https://en.wikipedia.org/wiki/Checklist and archived as early as Nov. 30, 2012 at internet archive (https://web.archive.org/web/20121130092512/http://en.wikipedia.org/wiki/Checklist) (Year: 2012).*

*Primary Examiner* — William A Beutel
(74) *Attorney, Agent, or Firm* — Fernando & Partners, LLP

(57) ABSTRACT

In one implementation, a method of displaying a task list is performed by a device including an image sensor, a display, one or more processors, and non-transitory memory. The method includes obtaining, using the image sensor, a video stream of a physical environment. The method includes displaying, on the display in association with the physical environment, a task list including a plurality of task elements respectively associated with a plurality of tasks, wherein the plurality of task elements includes a first task element associated with a first task and a second task element associated with a second task. The method includes detecting, in the video stream of the physical environment, completion of the first task. The method includes, in response to detecting completion of the first task, changing display of the first task element.

21 Claims, 21 Drawing Sheets

(56) References Cited

U.S. PATENT DOCUMENTS

| | | | |
|---|---|---|---|
| 2013/0091453 A1* | 4/2013 | Kotler | G06Q 10/0631 |
| | | | 715/772 |
| 2014/0172640 A1* | 6/2014 | Argue | G06Q 30/0641 |
| | | | 705/26.61 |
| 2017/0018274 A1* | 1/2017 | German | G06F 3/167 |
| 2018/0082573 A1* | 3/2018 | Zuckerman | G16H 40/20 |
| 2018/0101810 A1* | 4/2018 | Feng | G06Q 10/1097 |
| 2019/0244428 A1* | 8/2019 | Greenberg | G06Q 50/02 |
| 2019/0370544 A1 | 12/2019 | Wright, Jr. et al. | |
| 2019/0384406 A1* | 12/2019 | Smith | G06V 40/113 |
| 2019/0392643 A1* | 12/2019 | Busto | G06F 3/011 |
| 2020/0273255 A1* | 8/2020 | Godin | G09B 5/02 |

* cited by examiner

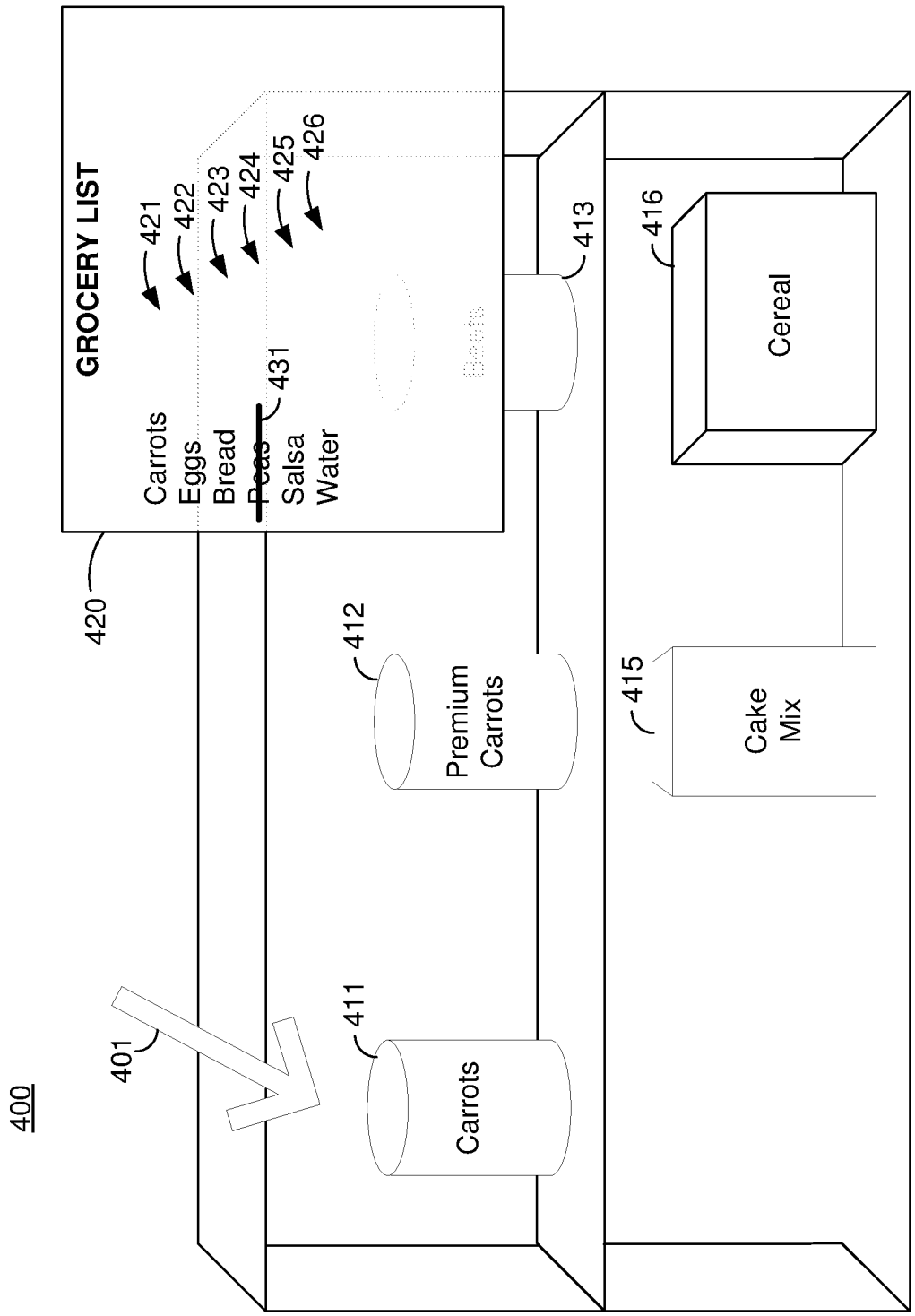
Figure 4C1

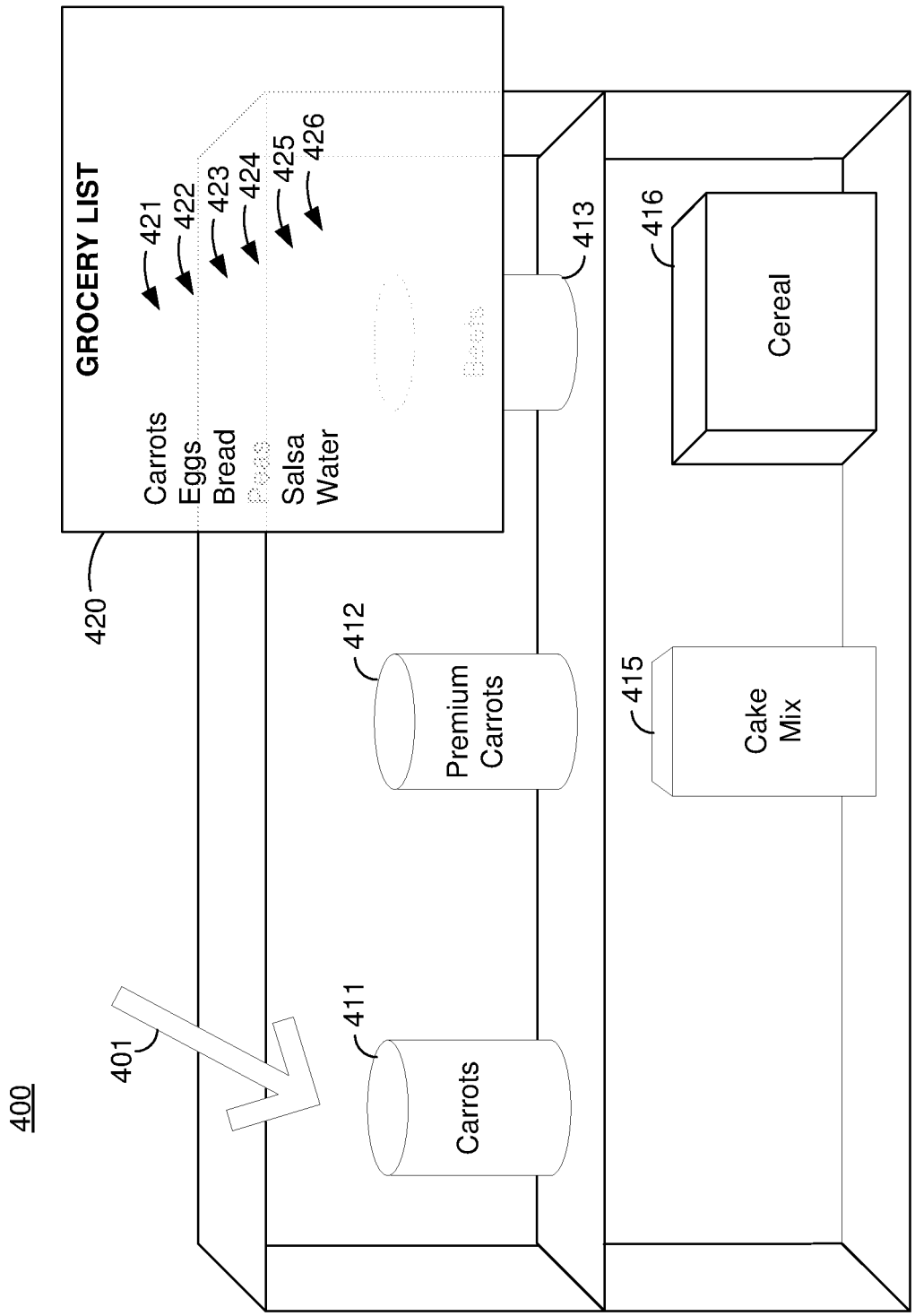
Figure 4C2

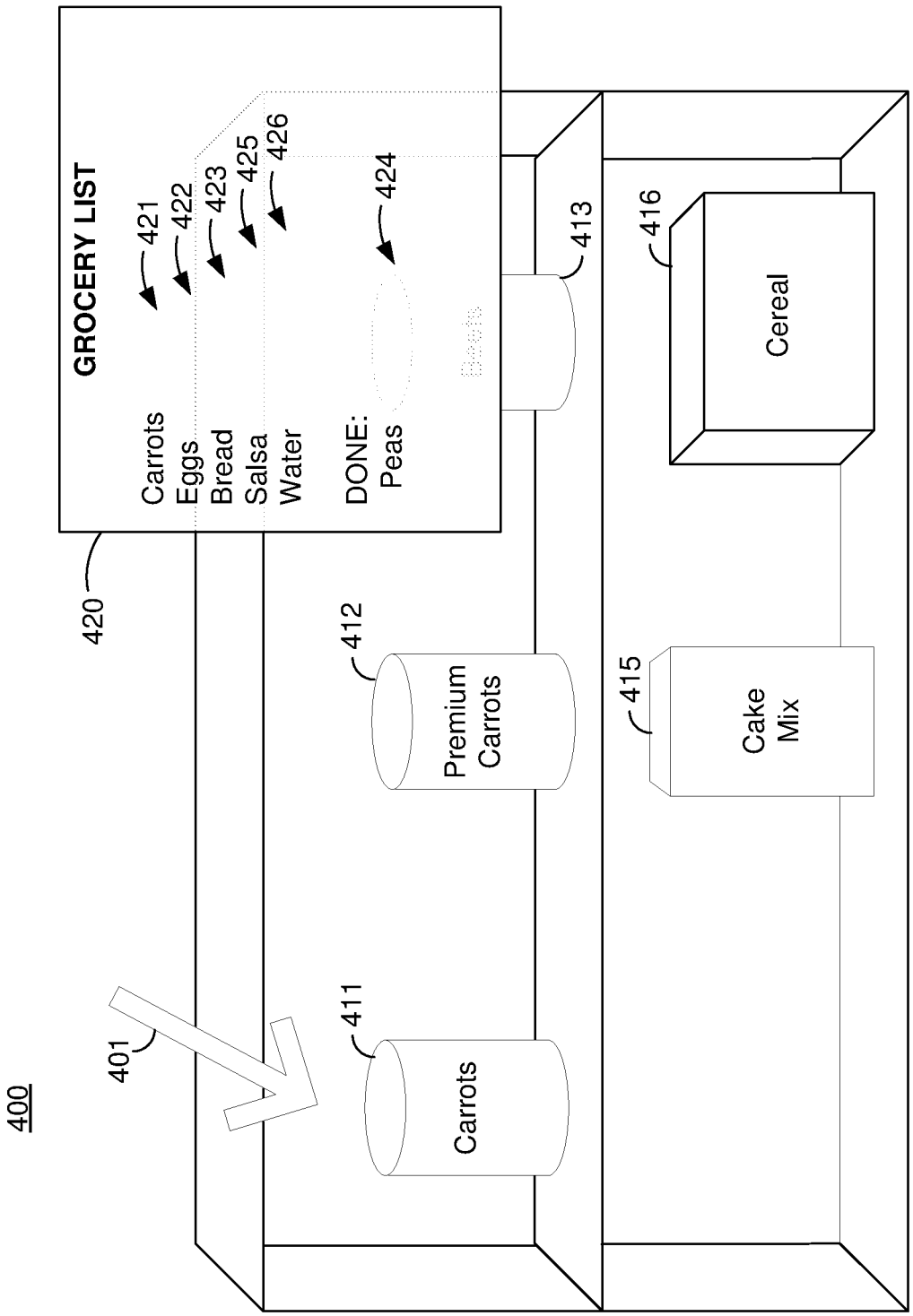
Figure 4C3

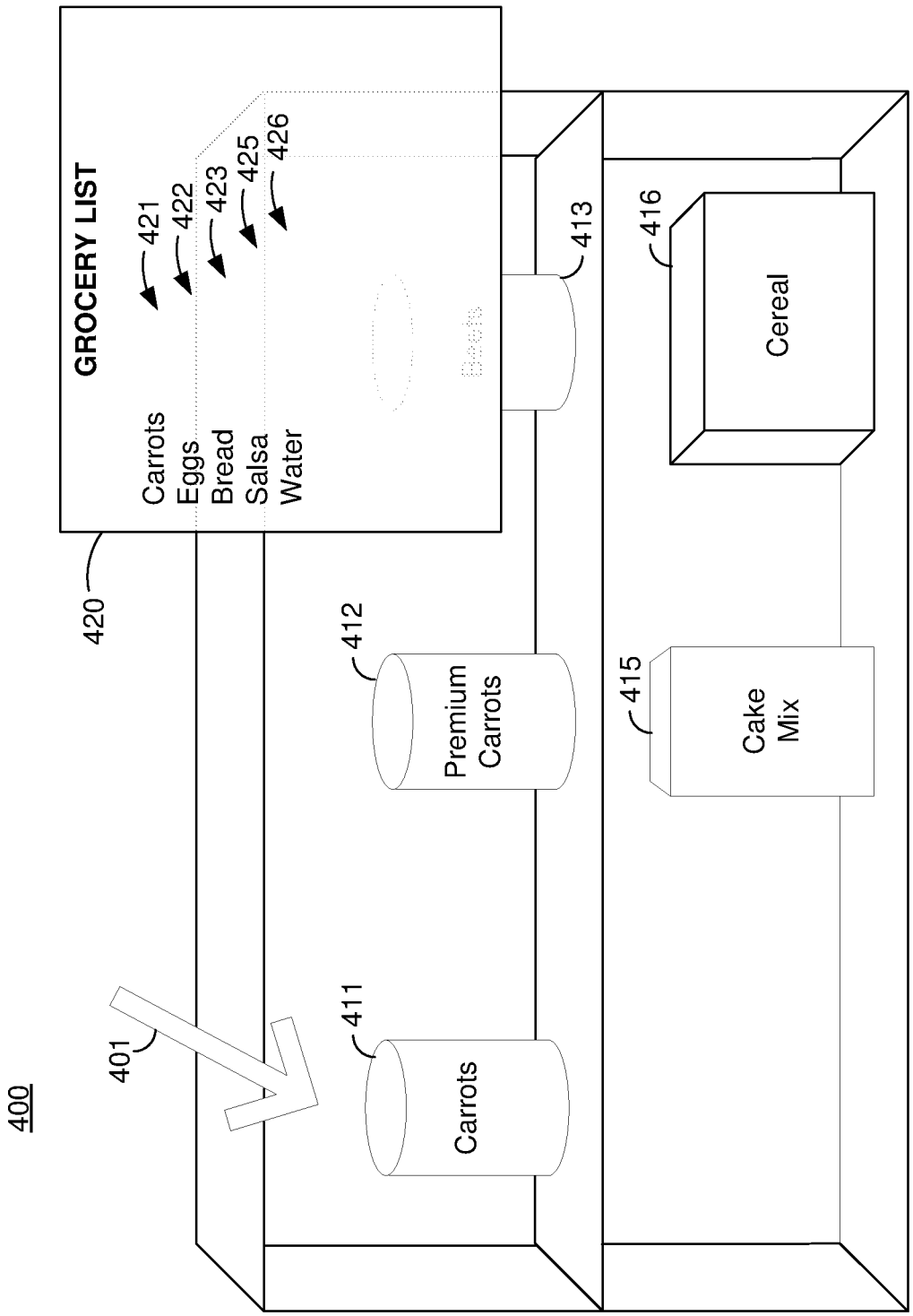
Figure 4C4

600

At a device including an image sensor, a display, one or more processors, and non-transitory memory:

Obtaining, using the image sensor, a video stream of a physical environment  ⟵ 610

↓

Displaying, on the display in association with the physical enviroment, a task list including a plurality of task elements respectively associated with a plurality of tasks, wherein the plurality of task elements includes a first task element associated with a first task and a second task element associated with a second task  ⟵ 620

↓

Detecting, in the video stream of the physical environment, completion of the first task  ⟵ 630

↓

In response to detecting completion of the first task, changing display of the first task element  ⟵ 640

Figure 6

METHOD AND DEVICE FOR DISPLAYING A TASK LIST

CROSS-REFERENCE TO RELATED APPLICATIONS

This application claims priority to U.S. Provisional Patent App. No. 63/058,931, filed on Jul. 30, 2020, which is hereby incorporated by reference herein in its entirety.

TECHNICAL FIELD

The present disclosure generally relates to systems, methods, and devices for displaying a task list.

BACKGROUND

To remember to complete a number of tasks, a person may keep a list of the tasks and mark tasks in the list as the tasks are completed. For example, a person may place a check next to items of a to-do list as tasks are completed or cross-out items of a grocery list as the person retrieves the items.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4K illustrate an XR environment based on a physical environment of a grocery store.

FIG. 6 is a flowchart representation of a method of displaying a task list in accordance with some implementations.

Figure 1:
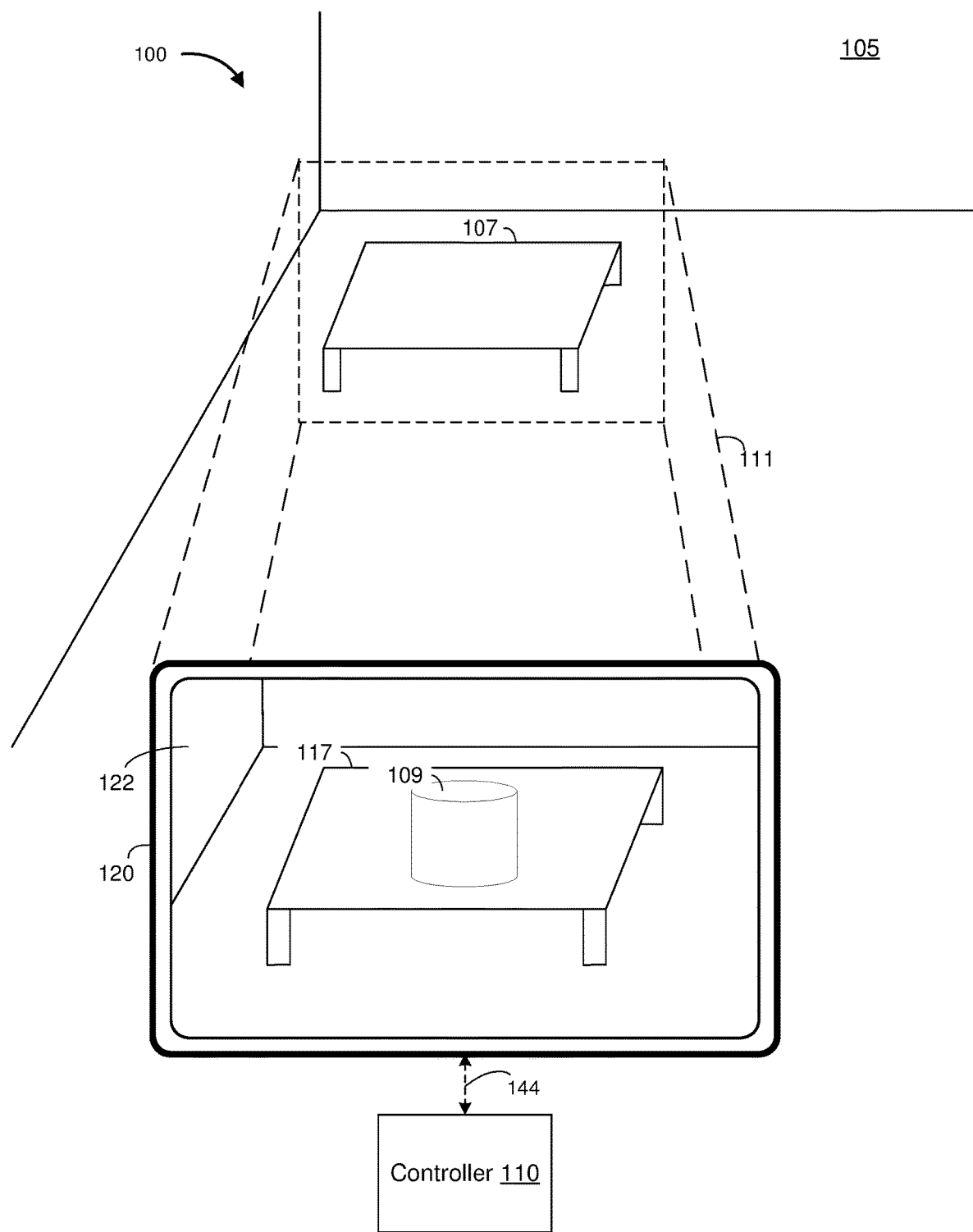
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for displaying a task list. In various implementations, the method is performed by a device including an image sensor, a display, one or more processors, and non-transitory memory. The method includes obtaining, using the image sensor, a video stream of a physical environment. The method includes displaying, on the display in association with the physical environment, a task list including a plurality of task elements respectively associated with a plurality of tasks, wherein the plurality of task elements includes a first task element associated with a first task and a second task element associated with a second task. The method includes detecting, in the video stream of the physical environment, completion of the first task. The method includes in response to detecting completion of the first task, changing display of the first task element.

In accordance with some implementations, a device includes one or more processors, a non-transitory memory, and one or more programs: the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, a person may keep a list of tasks and mark tasks in the list as the tasks are completed. However, in various circumstances, the person may forget to utilize the list or forget to mark a task after it has been completed. Accordingly, in various implementations, a device displays a task list including a plurality of task elements respectively associated with a plurality of tasks. Further, as the device detects completion of a task of the plurality of tasks, e.g., in a video of the physical environment in which the task is completed, the device changes display of the corresponding task element. For example, in various implementations, the device displays a line through the task element or removes the task element from the task list.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display a virtual object (e.g., a virtual cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
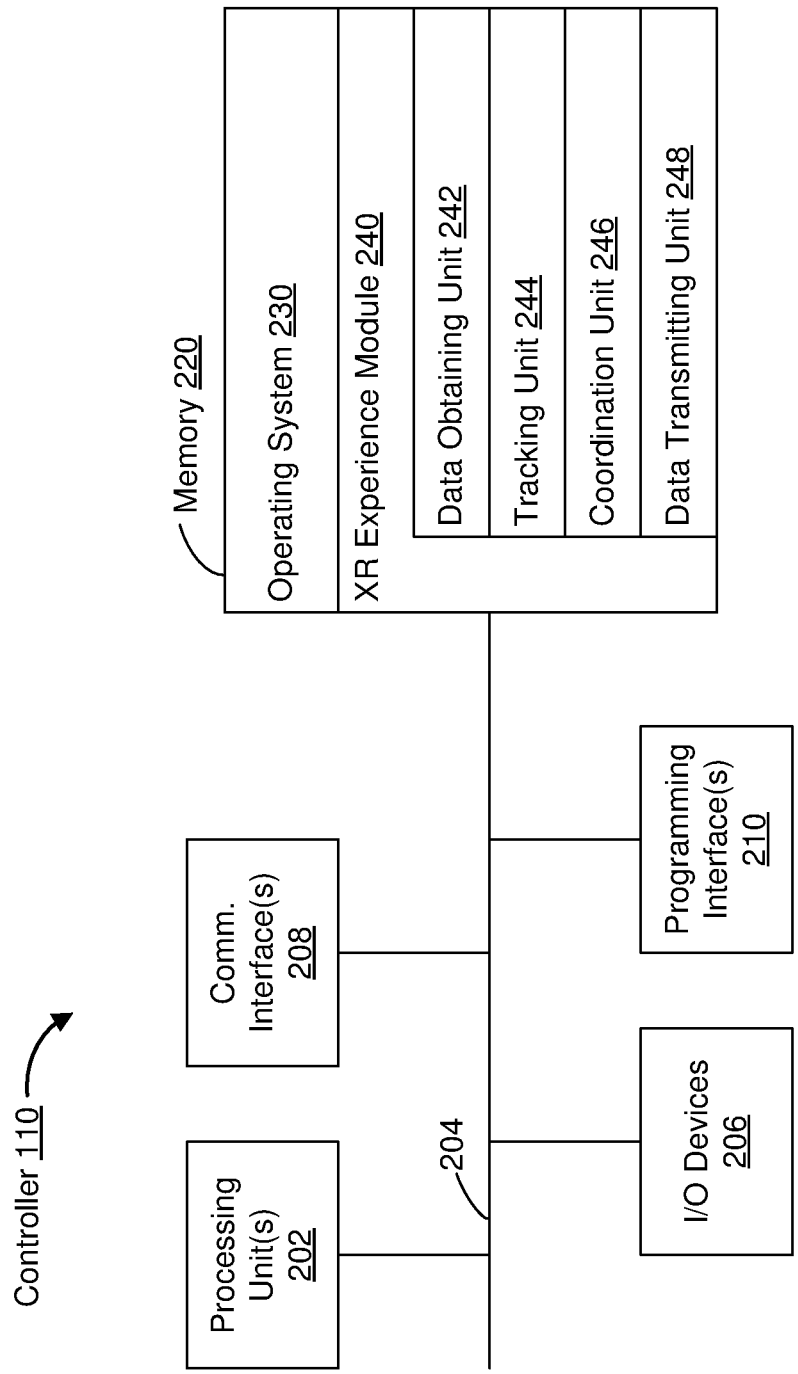
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
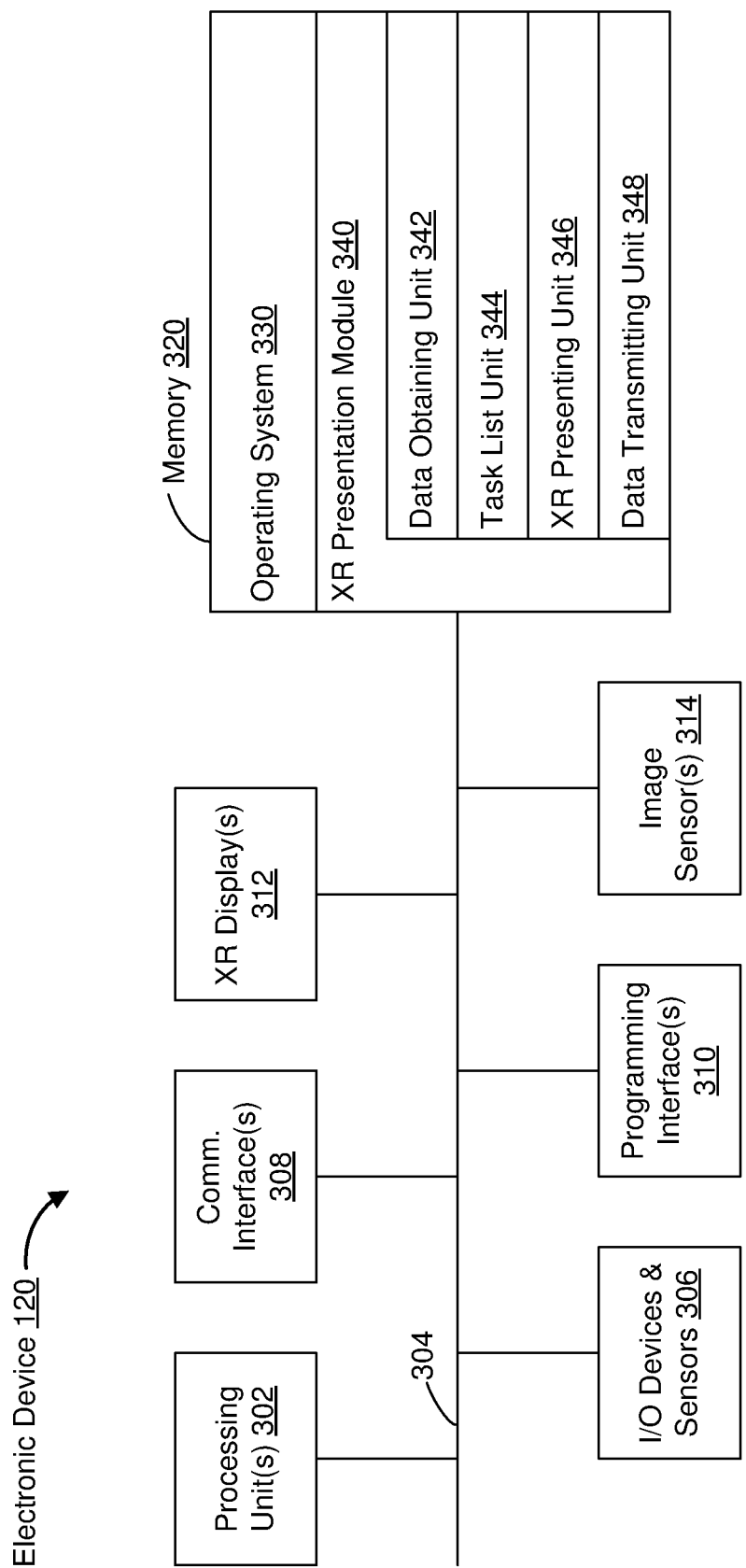
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the physical environment as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a task list unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the task list unit 344 is configured to track completion of tasks of a task list. To that end, in various implementations, the task list unit 344 includes instructions and/or logic therefor, and heuristics and metadata therefor.

In some implementations, the XR presenting unit 346 is configured to display the task list via the one or more XR displays 312. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the task list unit 344, the XR presenting unit 346, and the data transmitting unit 348 are shown as residing on a single device (e.g., the electronic device 120), it should be understood that in other implementations, any combination of the data obtaining unit 342, the task list unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-4K illustrate an XR environment 400 based on a physical environment of a grocery store. FIGS. 4A-4K illustrate the XR environment 400 from the perspective of a user while the user completes one or more tasks. In various implementations, the perspective of the user is from a location of an image sensor of an electronic device. For example, in various implementations, the electronic device is a handheld electronic device and the perspective of the user is from a location of the image sensor of the handheld electronic device directed towards the physical environment. In various implementations, the perspective of the user is from the location of a user of the electronic device. For example, in various implementations, the electronic device is a head-mounted electronic device and the perspective of the user is from a location of the user directed towards the physical environment, generally approximating the field-of-view of the user were the head-mounted electronic device not present. In various implementations, the perspective of the user is from the location of an avatar of the user. For example, in various implementations, the XR environment 400 is a virtual environment and the perspective of the user is from location of an avatar or other representation of the user directed towards the virtual environment.

Figure 4A:
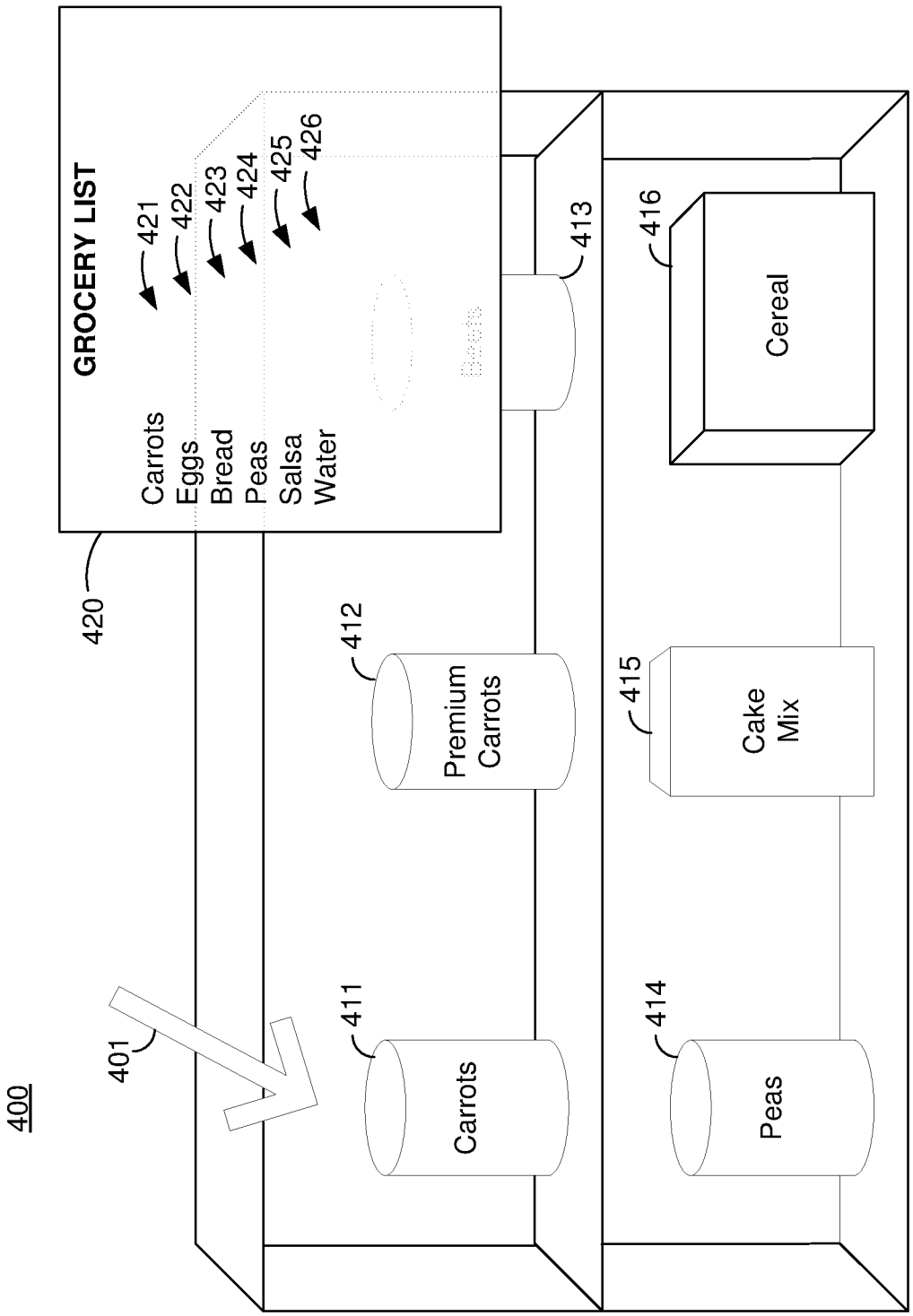

FIG. 4A illustrates the XR environment 400 at a first time. At the first time, the XR environment 400 includes a plurality of objects, including one or more real objects (e.g., carrots 411, premium carrots 412, beets 413, peas 414, cake mix 415 and cereal 416) and one or more virtual objects (e.g., a virtual arrow 401 and a grocery list 420). In various implementations, certain objects (such as the real objects 411-416 and the virtual arrow 401) are displayed at a location in the XR environment 400, e.g., at a location defined by three coordinates in a three-dimensional (3D) XR coordinate system. Accordingly, when the user moves in the XR environment 400 (e.g., changes either position and/or orientation), the objects are moved on the display of the device but retain their location in the XR environment 400. In various implementations, certain virtual objects (such as the grocery list 420) are displayed at locations on the display such that when the user moves in the XR environment 400, the objects are stationary on the display on the device.

At the first time, the grocery list 420 includes a plurality of elements 421-426 corresponding to a plurality of tasks.

The grocery list 420 includes a carrots element 421 corresponding to a task to obtain carrots, an eggs element 422 corresponding to a task to obtain eggs, a bread element 423 corresponding to a task to obtain bread, a peas element 424 corresponding to a task to obtain peas, a salsa element 425 corresponding to a task to obtain salsa, and a water element 426 corresponding to a task to obtain water.

In various implementations, the grocery list 420 is at least partially transparent. Accordingly, in FIG. 4A, the beets 413 are partially visible through the grocery list 420.

In various implementations, the grocery list 420 is displayed in response to a trigger event. For example, in various implementations, the grocery list 420 is displayed in response to a user request, which may be verbal request. In various implementations, the grocery list 420 is displayed in response to detecting that the user is at a grocery store, e.g., using GPS or in response to detecting groceries in the video stream.

At the first time, the virtual arrow 401 points at the carrots 411. In various implementations, in response to detecting an object associated with a corresponding task of the plurality of tasks in a video stream of the physical environment, the virtual arrow 401 is displayed in association with the object. Thus, in FIG. 4A, in response to detecting the carrots 411 corresponding to the carrots element 421, the virtual arrow 401 is displayed pointing at the carrots 411. In various implementations, in response to detecting an object associated with a corresponding task of the plurality of tasks, the object is highlighted (e.g., with a glow surrounding the object) or otherwise indicated.

Figure 4B:
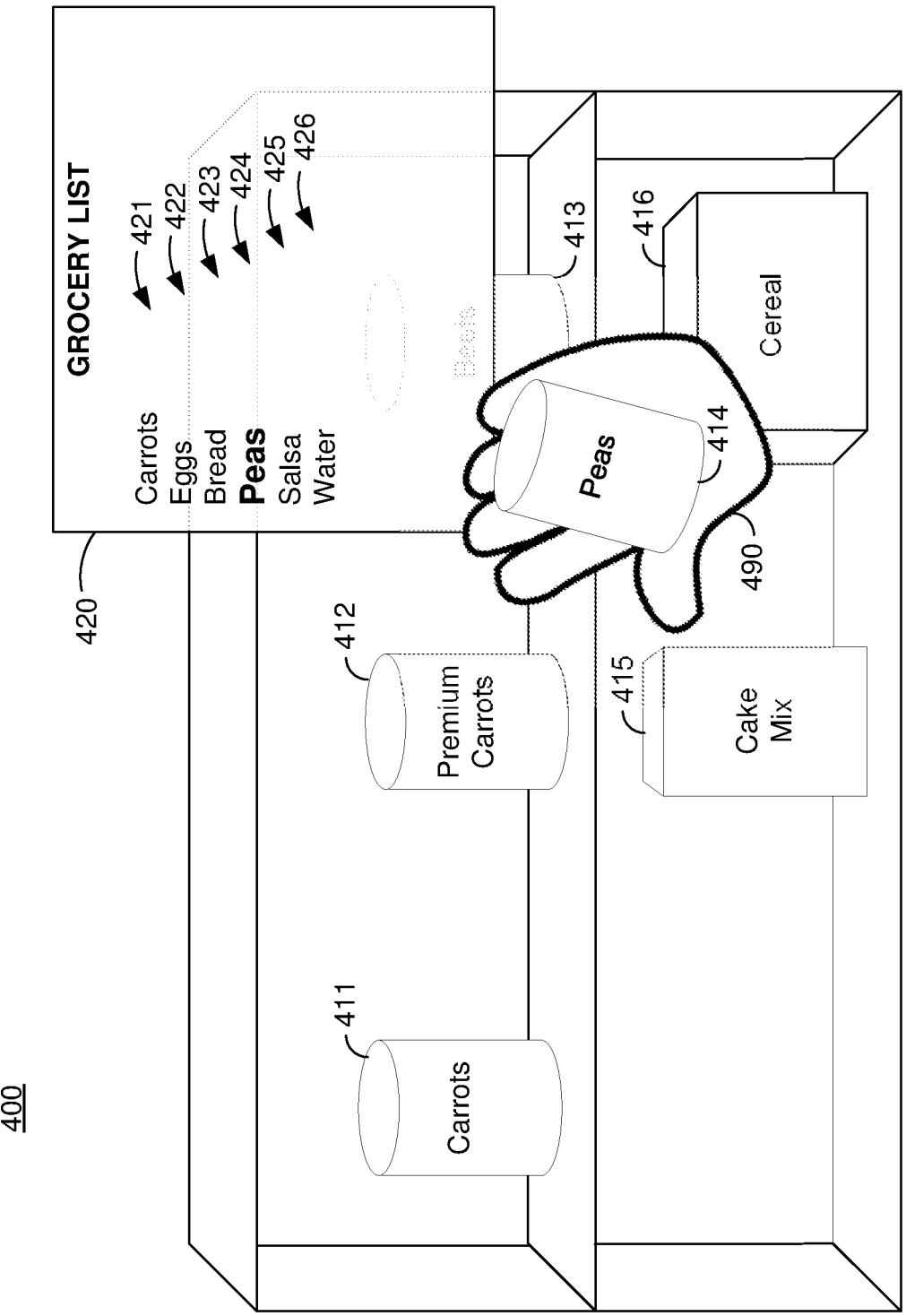

FIG. 4B illustrates the XR environment 400 at a second time subsequent to the first time. At the second time, the user has picked up the peas 414. Accordingly, at the second time, the XR environment 400 includes the hand of the user 490 holding the peas 414.

In response to detecting that the user has picked up the peas 414, display of the peas element 424 in the grocery list 420 is changed. In FIG. 4B, the peas element 424 is displayed in bold with a slightly larger font size. In various implementations, in response to detecting that the user is interacting with an object associated with a corresponding task of the plurality of tasks, display of the corresponding element in the grocery list 420 is changed.

FIGS. 4C1-4C4 illustrate the XR environment 400 at a third time subsequent to the second time in accordance with various embodiments. At the third time, the user has placed the peas 414 in a shopping cart. Accordingly, at the third time, the XR environment 400 no longer includes the peas 414.

In response to detecting that the user has completed the task associated with the peas element 424, e.g., that the user has obtained the peas 414, display of the peas element 424 is changed. In various implementations, in response to detecting that the user has completed a task associated with an element, display of the element is changed in various ways.

In FIG. 4C1, the peas element 424 includes a line 431 through the peas element 424. Thus, in FIG. 4C1, the text of the peas element 424 is crossed out or struck through.

In FIG. 4C2, the peas element 424 is displayed in a different color than in FIG. 4B. Thus, in FIG. 4C2, the text of the peas element 424 is grayed out.

In FIG. 4C3, the peas element 424 is displayed at a different location than in FIG. 4B. Thus, in FIG. 4C3, the peas element 424 is moved to the bottom of the grocery list 420 in a "done" section.

In FIG. 4C4, the peas element 424 is not displayed. Thus, in FIG. 4C4, the peas element 424 is removed from the grocery list 420.

Figure 4D:
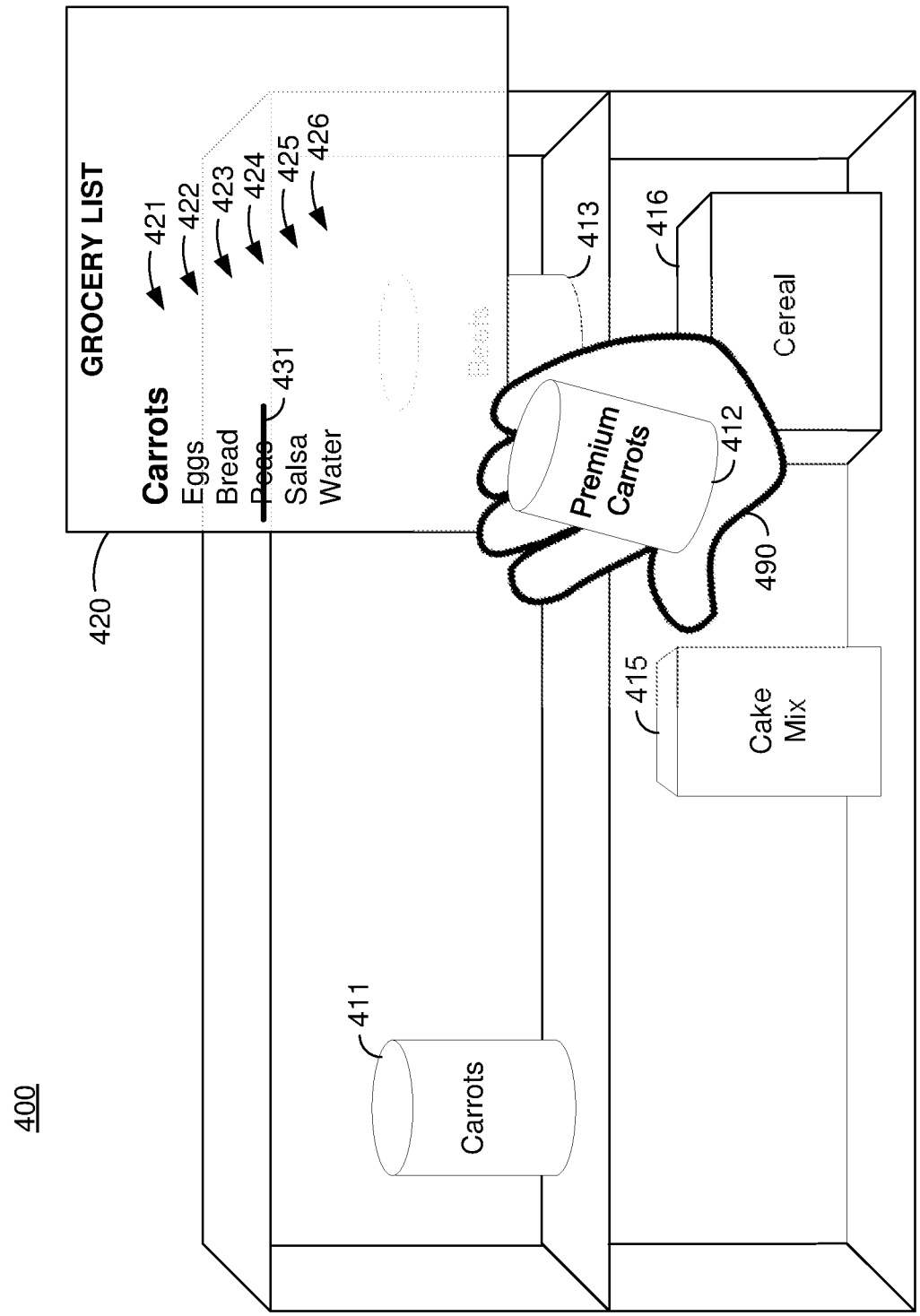

FIG. 4D illustrates the XR environment 400 at a fourth time subsequent to the third time. At the fourth time, the user has picked up the premium carrots 412. Accordingly, at the fourth time, the XR environment 400 includes the hand of the user 490 holding the premium carrots 412.

In response to detecting that the user has picked up the premium carrots 412, display of the carrots element 421 in the grocery list 420 is changed. In FIG. 4D, the carrots element 421 is displayed in bold with a slightly larger font size.

Figure 4E:
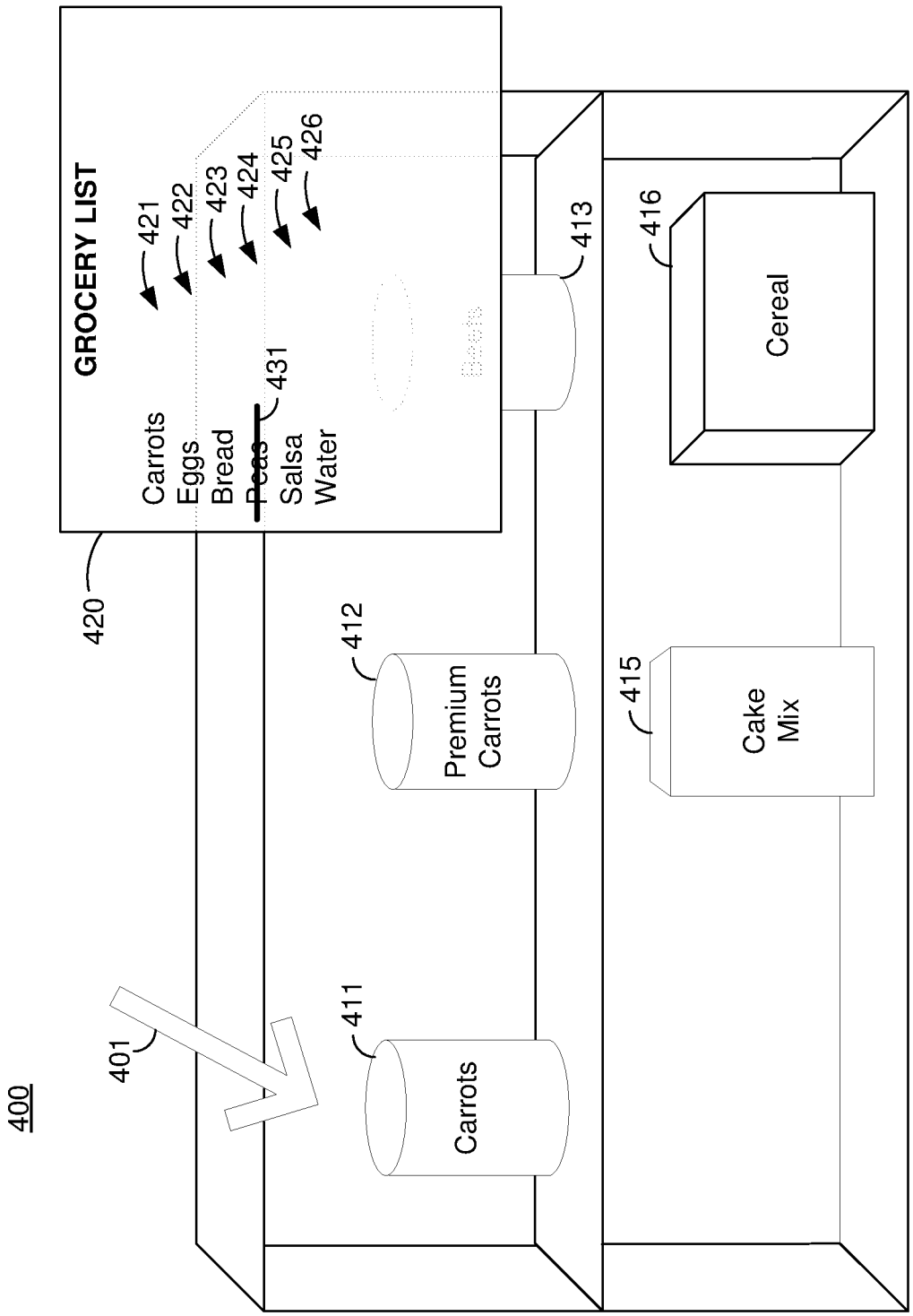

FIG. 4E illustrates the XR environment 400 at a fifth time subsequent to the fourth time. At the fifth time, the user has replaced the premium carrots 412. Accordingly, at the fifth time, the XR environment 400 includes the premium carrots 412.

In response to detecting that the user has replaced the premium carrots 412, display of the carrots element 421 in the grocery list 420 is reverted. In FIG. 4E, the carrots element 421 is displayed in the same manner as in FIGS. 4C1-4C4. As noted above, in various implementations, in response to detecting that the user is interacting with an object associated with a corresponding task of the plurality of tasks, display of the corresponding element in the grocery list 420 is changed. In response to detecting that the user has ceased interacting with the object, but has not completed the task, display of the corresponding element in the grocery list 420 is reverted.

Figure 4F:
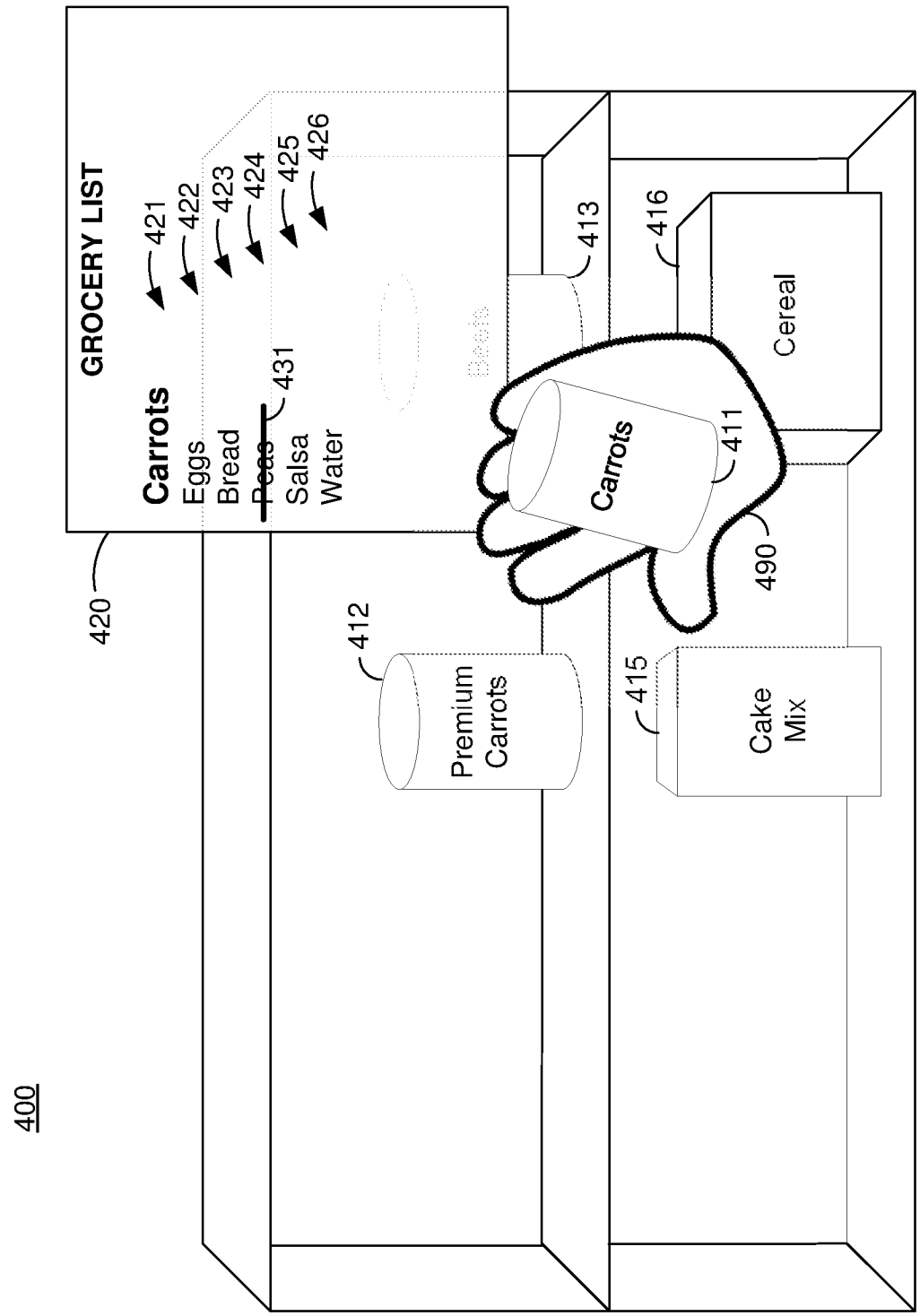

FIG. 4F illustrates the XR environment 400 at a sixth time subsequent to the fifth time. At the sixth time, the user has picked up the carrots 411. Accordingly, at the sixth time, the XR environment 400 includes the hand of the user 490 holding the carrots 411.

In response to detecting that the user has picked up the carrots 411, display of the carrots element 421 in the grocery list 420 is changed. In FIG. 4F, the carrots element 421 is displayed in bold with a slightly larger font size.

Figure 4G:
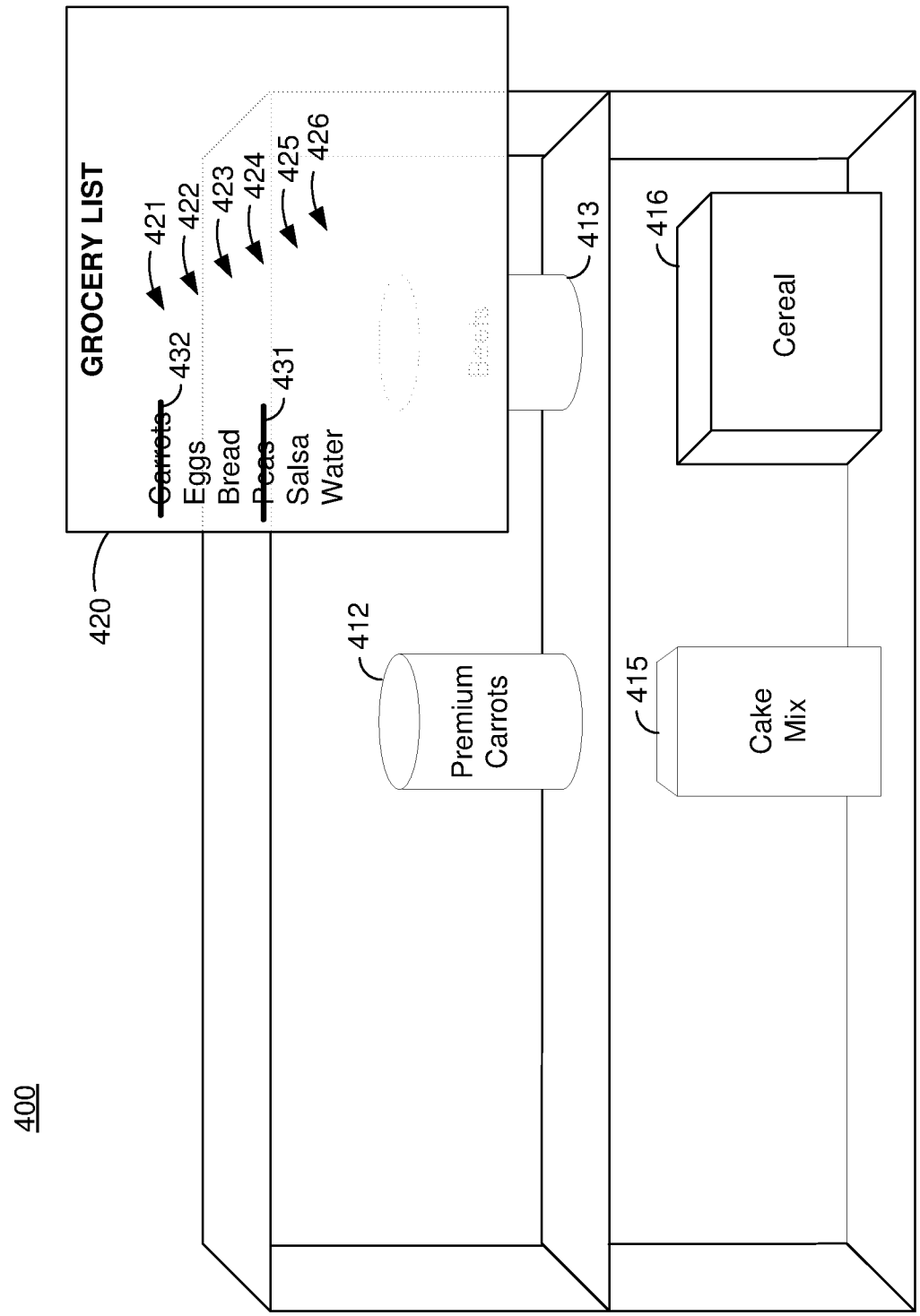

FIG. 4G illustrates the XR environment 400 at a seventh time subsequent to the sixth time. At the seventh time, the user has placed the carrots 411 in a shopping cart. Accordingly, at the third time, the XR environment 400 no longer includes the carrots 411.

In response to detecting that the user has completed the task associated with the carrots element 421, e.g., that the user has obtained the carrots 411, display of the carrots element 421 is changed. In FIG. 4G, the carrots element 421 includes a line 432 through the carrots element 421.

Figure 4H:
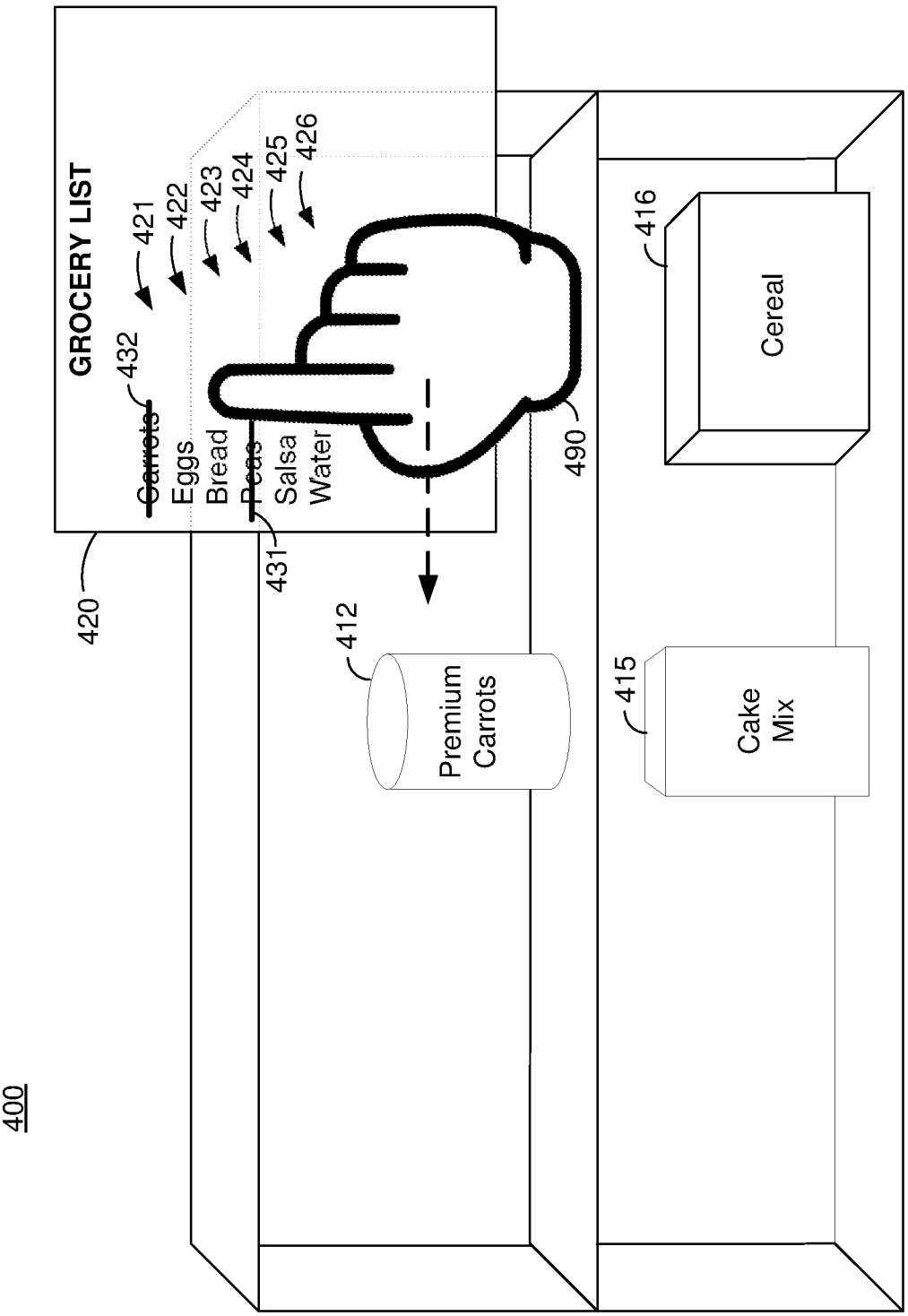

FIG. 4H illustrates the XR environment 400 at an eighth time subsequent to the seventh time. At the eighth time, the user is performing a gesture interacting with the bread element 423. Accordingly, at the eighth time, the XR environment includes the hand of the user 490. In particular, the user points at the bread element 423 and swipes the hand of the user 490 to the left.

Figure 4I:
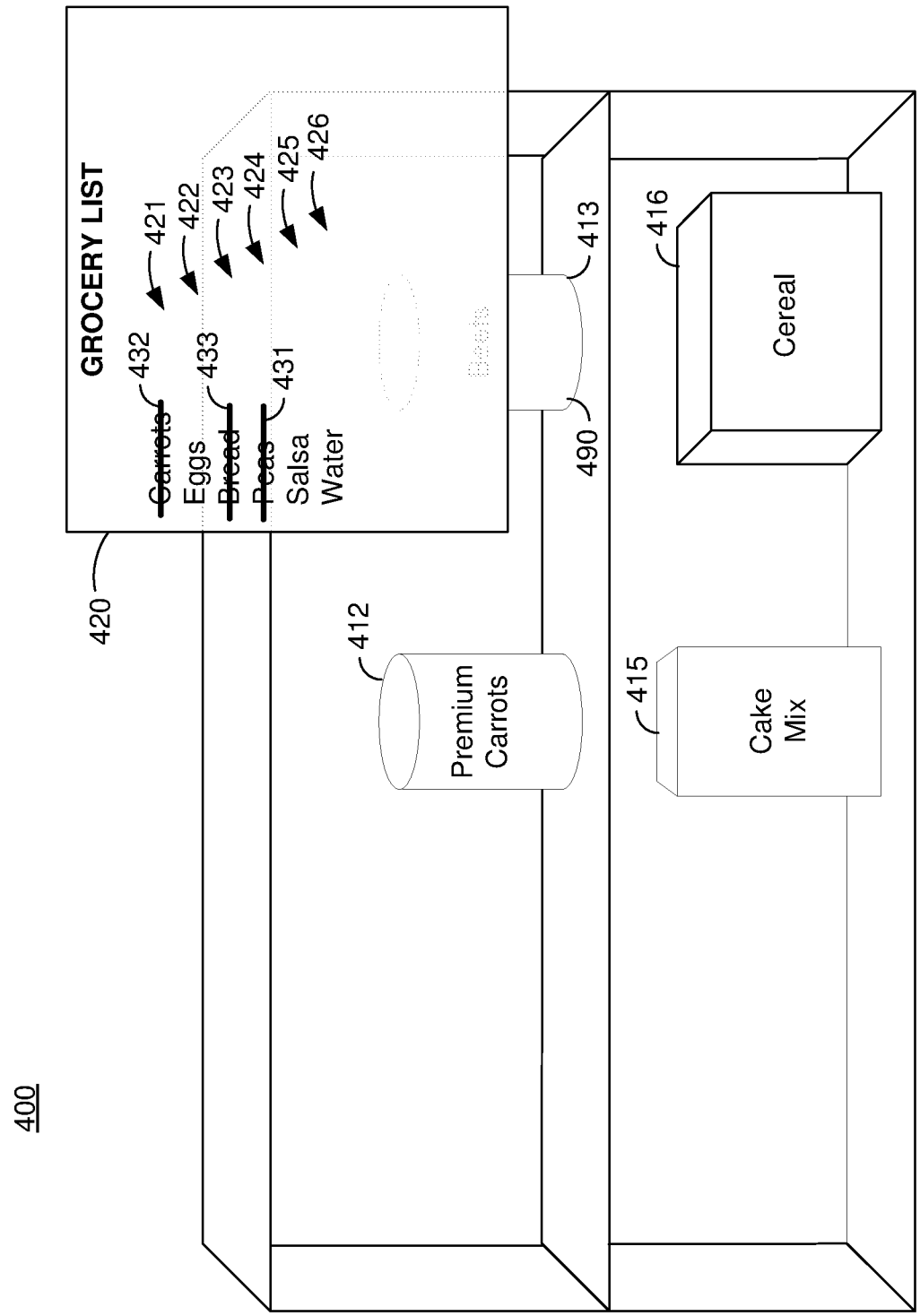

FIG. 4I illustrates the XR environment 400 at a ninth time subsequent to the eighth time. At the ninth time, in response to detecting the gesture interacting with the bread element 423, display of the bread element 423 is changed. In FIG. 4I, the bread element 423 includes a line 433 through the bread element 423.

Figure 4J:
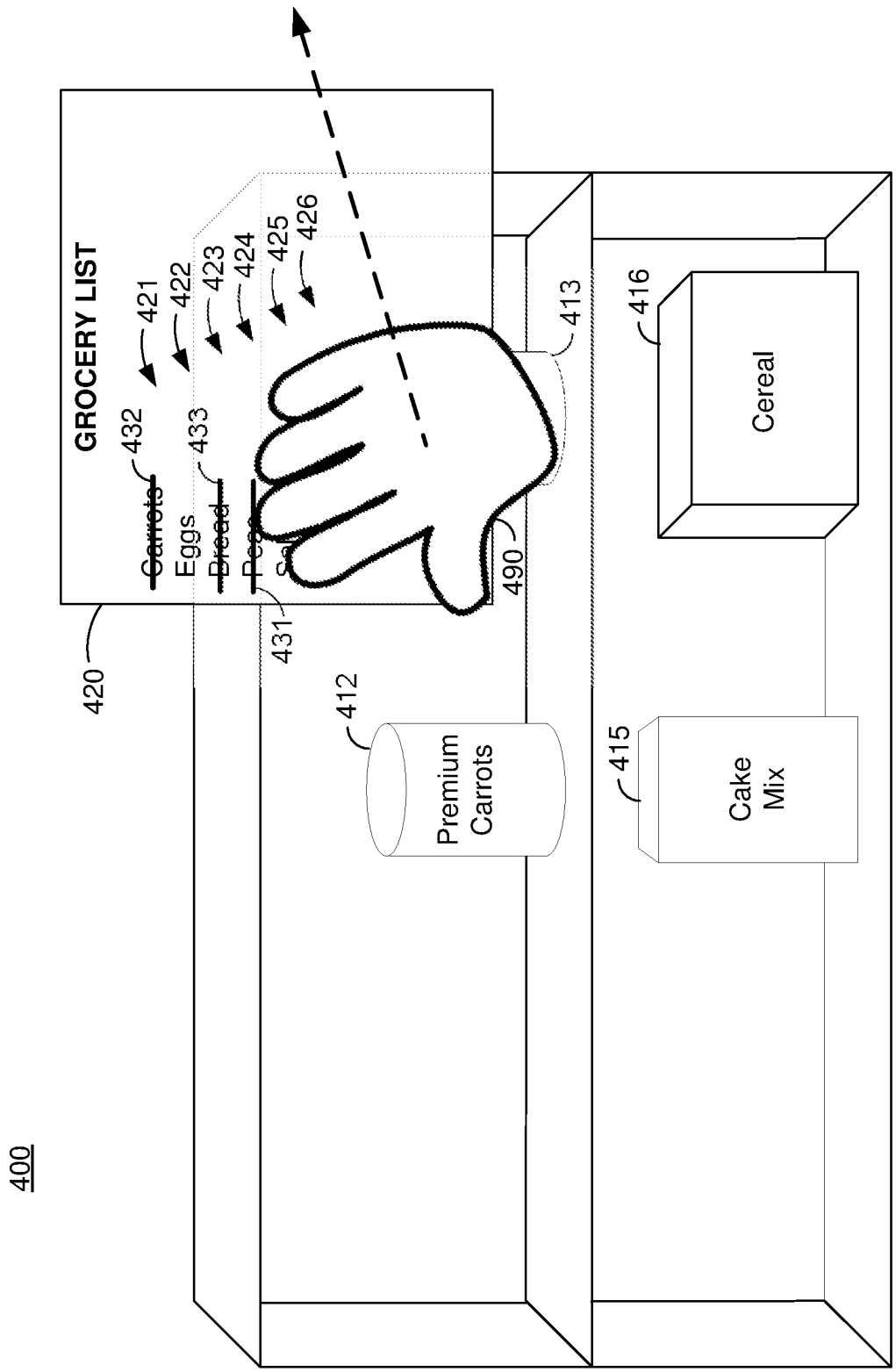

FIG. 4J illustrates the XR environment 400 at a tenth time subsequent to the ninth time. At the tenth time, the user is performing a gesture interacting with the grocery list 420. Accordingly, at the tenth time, the XR environment includes the hand of the user 490. In particular, the user directs an open hand towards the grocery list 420 and swipes the hand of the user 490 up and to the right.

Figure 4K:
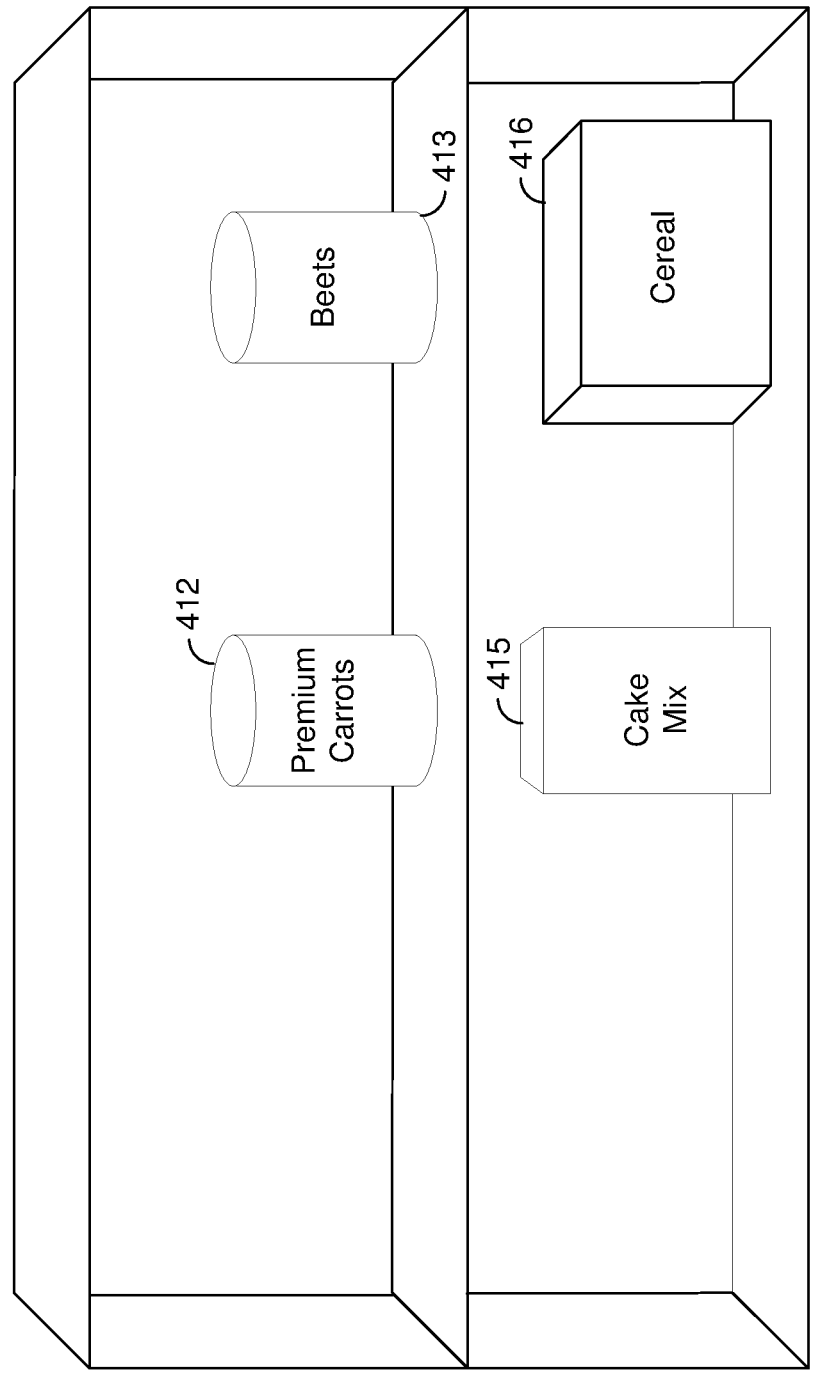

FIG. 4K illustrates the XR environment 400 at an eleventh time subsequent to the tenth time. At the eleventh time, in response to detecting the gesture interacting with the grocery list 420, the grocery list 420 ceases to be displayed. In various implementations, in response to various gestures interacting with the grocery list 420, the grocery list 420 is moved on the display or resized.

Figure 5A:
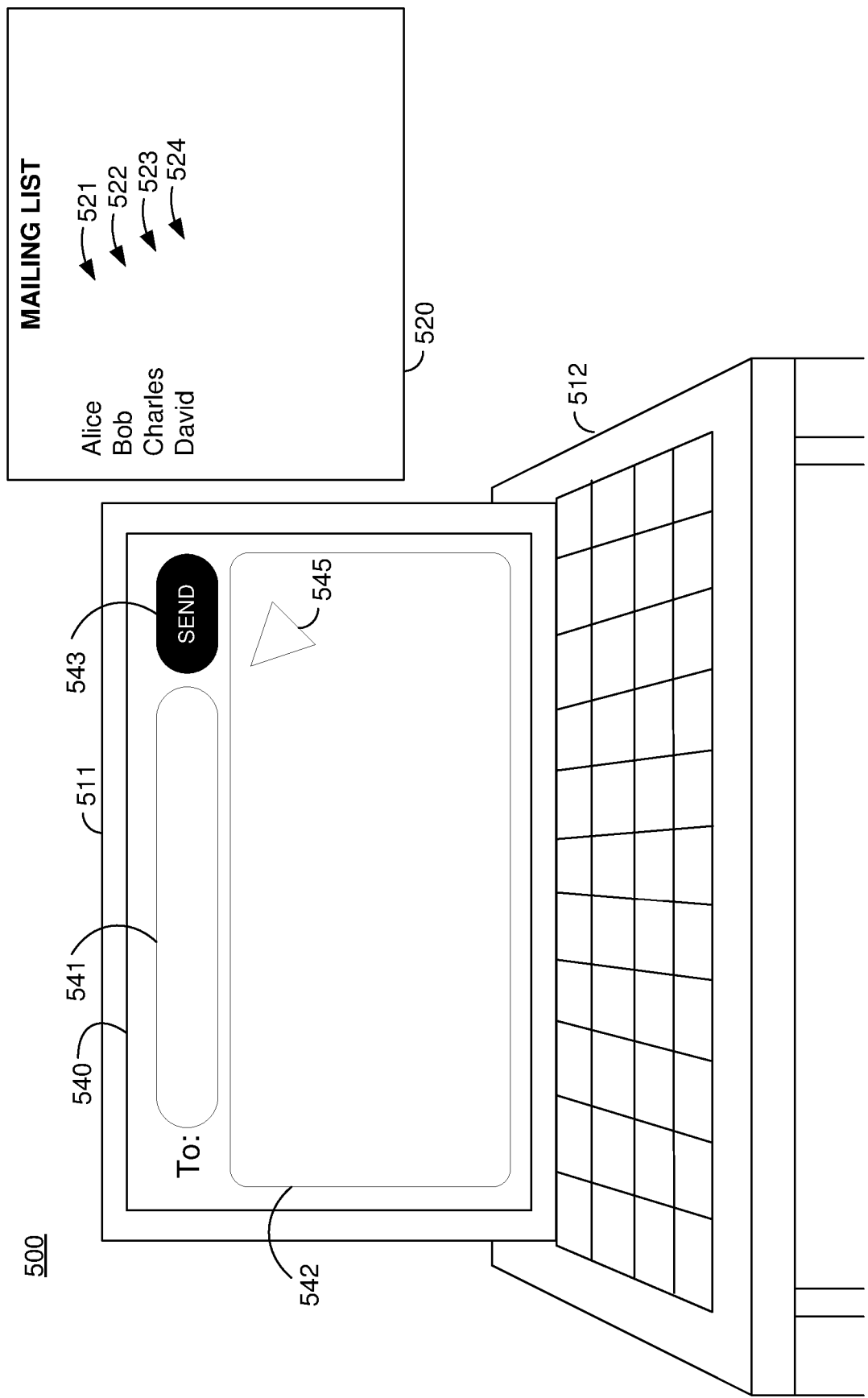
FIGS. 5A-5C illustrate an XR environment based on a physical environment of a workstation.
Figure 5B:
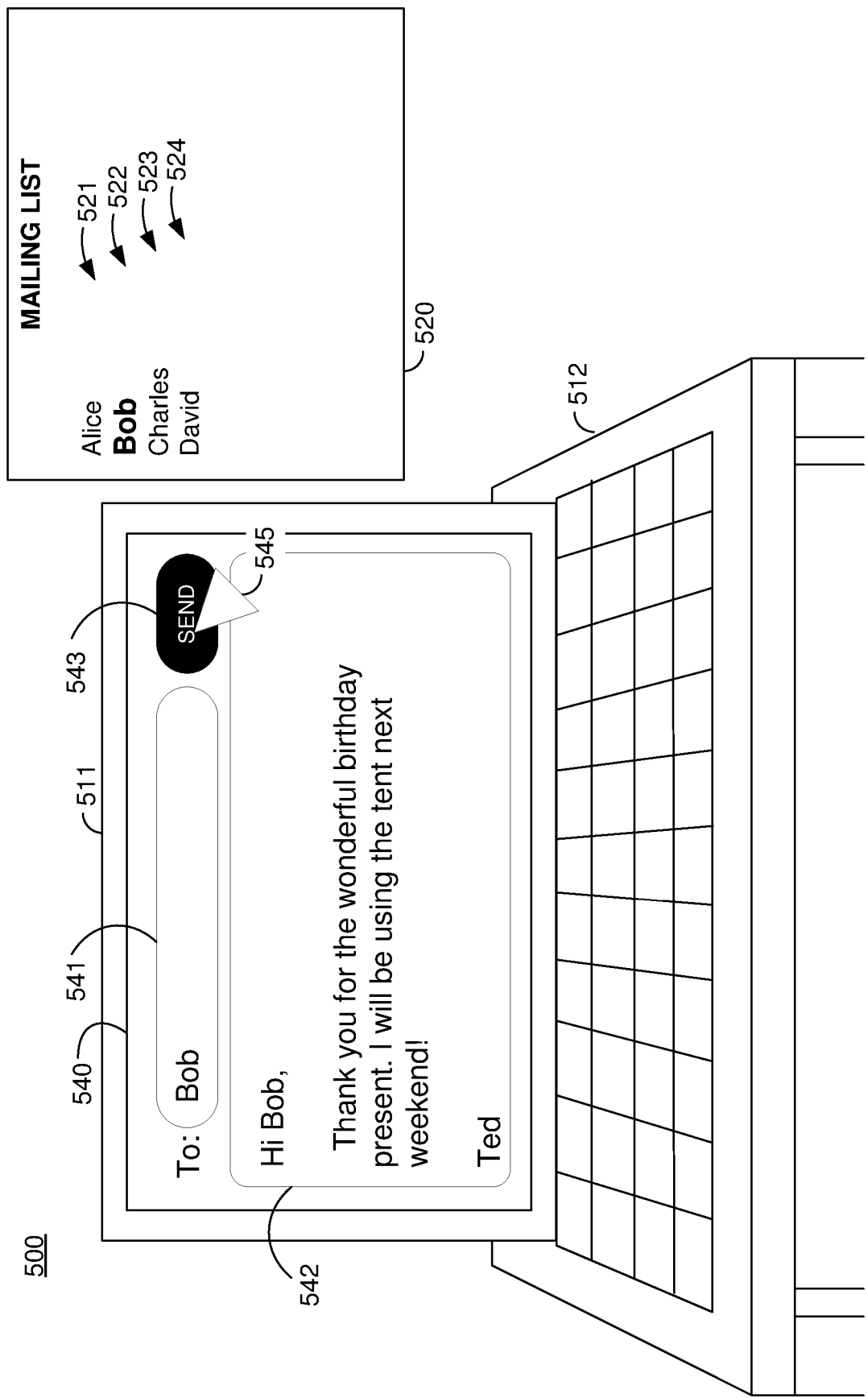
Figure 5C:
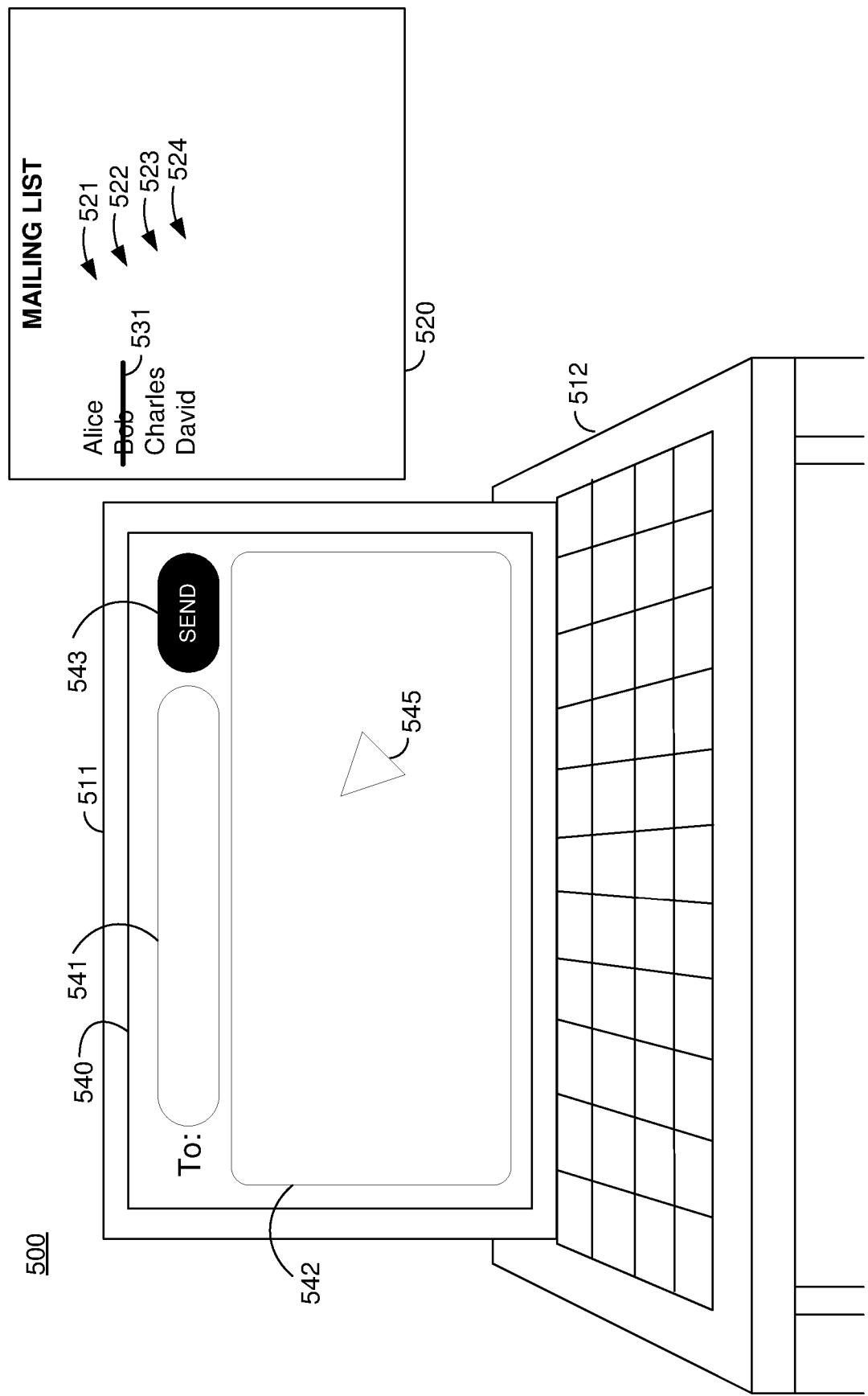

FIGS. 5A-5C illustrate an XR environment 500 based on a physical environment of a workstation. FIGS. 5A-5C illustrate the XR environment 500 from the perspective of a user while the user completes one or more tasks. In various implementations, the perspective of the user is from a location of an image sensor of an electronic device. For example, in various implementations, the electronic device is a handheld electronic device and the perspective of the user is from a location of the image sensor of the handheld electronic device directed towards the physical environment. In various implementations, the perspective of the user is from the location of a user of the electronic device. For example, in various implementations, the electronic device is a head-mounted electronic device and the perspective of the user is from a location of the user directed towards the physical environment, generally approximating the field-of-view of the user were the head-mounted electronic device not present. In various implementations, the perspective of the user is from the location of an avatar of the user. For example, in various implementations, the XR environment 500 is a virtual environment and the perspective of the user is from location of an avatar or other representation of the user directed towards the virtual environment.

FIG. 5A illustrates the XR environment 500 at a first time. At the first time, the XR environment 500 includes a plurality of objects, including one or more real objects (e.g., a laptop 511 on a desk 512) and one or more virtual objects (e.g., a mailing list 520).

At the first time, the laptop 511 displays a cursor 545 within an e-mail user interface 540 including a to field 541, a message field 542, and a send button 543. The mailing list 520 includes a plurality of elements 521-524 corresponding to a plurality of tasks. The mailing list 520 includes an Alice element 521 corresponding to a task to send an e-mail to Alice, a Bob element 522 corresponding to a task to send an e-mail to Bob, a Charles element 523 corresponding to a task to send an e-mail to Charles, and a David element 524 corresponding to a task to send an e-mail to David.

In various implementations, the mailing list 520 is displayed in response to a trigger event. For example, in various implementations, the mailing list 520 is displayed in response to a user request, which may be verbal request. In various implementations, the mailing list 520 is displayed in response to detecting the laptop 511 or the e-mail user interface 540 in the video stream.

FIG. 5B illustrates the XR environment 500 at a second time subsequent to the first time. At the second time, the user has entered "Bob" in the to field 541, entered a message in the message field 542, and moved the cursor 545 over the send button 543.

In response to detecting that the user has entered "Bob" in the to field 541, display of the Bob element 522 in the mailing list 520 is changed. In FIG. 5B, the Bob element 522 is displayed in bold with a slightly larger font size. In various implementations, in response to detecting that the user is interacting with an object associated with a corresponding task of the plurality of tasks (e.g., the laptop 511 with "Bob" entered in the to field 541 of the e-mail user interface 540), display of the corresponding element in the mailing list 520 is changed.

FIG. 5C illustrates the XR environment 500 at a third time subsequent to the second time. At the third time, the user has clicked the send button 543 sending an e-mail to Bob. Accordingly, at the third time, the to field 541 and the message field 542 of the e-mail user interface 540 are empty.

In response to detecting that the user has completed the task associated with the Bob element 522, e.g., that the user has sent an e-mail to Bob, display of the Bob element 522 is changed. In various implementations, in response to detecting that the user has completed a task associated with an element, display of the element is changed in various ways. In FIG. 5C, the Bob element 522 includes a line 531 through the Bob element 522. Thus, in FIG. 5C, the text of the Bob element 522 is crossed out or struck through.

FIG. 6 is a flowchart representation of a method 600 of displaying a task list in accordance with some implementations. In various implementations, the method 600 is performed by a device with an image sensor, one or more processors, and non-transitory memory (e.g., the electronic device 120 of FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory).

The method 600 begins, in block 610, with the device obtaining, using the image sensor, a video stream of a physical environment. For example, FIGS. 4A-4K illustrate a video stream of a physical environment of a grocery store from a perspective of a user while the user performs a plurality of tasks. As another example, FIGS. 5A-5C illustrate a video stream of a physical environment of a workspace from a perspective of a user while the user sends an e-mail.

The method 600 continues, in block 620, with the device displaying, on the display in association with the physical environment, a task list including a plurality of task elements respectively associated with a plurality of tasks, wherein the plurality of task elements includes a first task element associated with a first task and a second task element associated with a second task. For example, FIG. 4A illustrates the grocery list 420 including a plurality of elements 421-426 respectively associated with a plurality of tasks (e.g., obtaining a plurality of groceries). As another example, FIG. 5A illustrates the mailing list 520 including a plurality of elements 521-524 respectively associated with a plurality of tasks (e.g., sending e-mails to a plurality of recipients).

In various implementations, the display is an opaque display and the task list is displayed in association with the physical environment as a composite image of the task list and an image of the physical environment. Thus, in various implementations, displaying the task list includes displaying, based on the video stream of the physical environment, a video representation of the physical environment including the task list. In various implementations, the display is a transparent display and the task list is displayed in association with the physical environment as a projection over a view of the physical environment.

In various implementations, the method 600 includes detecting a trigger event and displaying the task list (in block 620) is performed in response to detecting the trigger event. In various implementations, the detecting the trigger event includes detecting a user request to display the task list, which may be a verbal request. In various implementations, detecting the trigger event includes detecting that the device is at a particular location. For example, in various implementations, the grocery list 420 of FIG. 4A is displayed in response to detecting that the user is at a grocery store, e.g., using GPS or in response to detecting groceries in the video stream. In various implementations, detecting the trigger event includes detecting a particular object in the video stream of the physical environment. For example, in various implementations, the mailing list 520 of FIG. 5A is displayed in response to detecting the laptop 511 or the e-mail user interface 540 in the video stream.

In various implementations, in response to determining that the trigger event is a first trigger event, displaying the task list includes displaying a first task list including a first plurality of task elements and wherein, in response to determining that the trigger event is a second trigger event, displaying the task list includes displaying a second task list including a second plurality of task elements different than the first plurality of task elements. For example, in various implementations, in response to detecting groceries in the video stream of the physical environment, the grocery list 420 of FIG. 4A is displayed and, in response to detecting the laptop 511 in the video stream of the physical environment, the mailing list 520 of FIG. 5A is displayed.

In various implementations, the plurality of tasks includes user interaction with a respective plurality of objects. For example, in FIG. 4A, the grocery list 420 includes a plurality of elements 421-426 respectively associated with a plurality of tasks of interacting with a respective plurality of groceries (e.g., taking the groceries off a shelf and placing the groceries in a basket). In various implementations, the plurality of tasks includes sending messages to a respective plurality of recipients. For example, in FIG. 5A, the mailing list 520 including a plurality of elements 521-524 respectively associated with a plurality of tasks of sending e-mails to a respective plurality of recipients.

In various implementations, the plurality of tasks includes tasks to be performed by a user of the electronic device, thereby forming a to-do list. In various implementations, the plurality of tasks includes tasks to be performed by one or more people other than the user of the device, such as employees of a user of the device, thereby forming a quality control list.

The method 600 continues, in block 630, with the device detecting, in the video stream of the physical environment, completion of the first task. The method 600 continues, in block 640, with the device, in response to detecting completion of the first task, changing display of the first task element. In various implementations, changing display of the first task element includes changing from displaying the first task element in a first manner to displaying the first task element in a second manner.

In various implementations, changing display of the first task element includes displaying a line through the first task element. For example, in FIG. 4C1, the peas element 424 includes a line 431 through the peas element 424. In various implementations, changing display of the first task element includes changing a color of the first task element. For example, in FIG. 4C2, the peas element 424 is displayed in a different color than in FIG. 4B. In various implementations, changing display of the first task element includes moving the first task element in the task list. For example, in FIG. 4C3, the peas element 424 is displayed at a different location than in FIG. 4B. In various implementations, changing display of the first task element includes removing the first task element from the task list. In various implementations, changing display of the first task element includes ceasing display of the first task element. For example, in FIG. 4C4, the peas element 424 is not displayed.

In various implementations, the method 600 includes detecting, in the video stream of the physical environment, that the first task is in progress, and, in response to detecting that the first task is in progress, changing display of the first task element. For example, in FIG. 4B, in response to detecting that the user has picked up the peas 414, display of the peas element 424 in the grocery list 420 is changed, e.g., the text is displayed in bold with a slightly larger font size. In various implementations, display of the first task element is changed in a first manner in response to detecting that the first task is in progress and display of the first task element is changed in a second manner in response to detecting completion of the first task. For example, in FIG. 4B, the peas element 424 is shown in bold and, in FIG. 4C1, the peas element 424 includes the line 431.

In various implementations, the method 600 includes detecting, in the video stream of the physical environment, that the second task is in progress and, in response to detecting that the second task is in progress, changing display of the second task element. For example, in FIG. 4D, in response to detecting that the user has picked up the premium carrots 412, display of the carrots element 421 is changed. In various implementations, the method 600 includes detecting, in the video stream of the physical environment, that the second task is no longer in progress and is not completed and, in response to detecting that the second task is in progress, reverting display of the second task element. For example, in FIG. 4E, in response to detecting that the user has replaced the premium carrots 412, display of the carrots element 421 is reverted.

In various implementations, the method 600 includes detecting a user input directed to the second task element and, in response to detecting the user input directed to the second task element, changing display of the second task element. For example, in FIG. 4H, the user performs a gesture directed to the bread element 423 and, in FIG. 4I, display of the bread element 423 includes the line 433.

In various implementations, the method 600 includes detecting a user input directed to the task list and, in response to detecting the user input directed to the task list, ceasing display of the task list. For example, in FIG. 4J, the user performs a gesture directed to the grocery list 420 and, in FIG. 4K, the grocery list 420 is not displayed.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including an image sensor, a display, one or more processors, and non-transitory memory:
   obtaining, using the image sensor, a video stream of a physical environment;
   displaying, via the display, at least a portion of the video stream of the physical environment;
   displaying a task list overlaid on at least the portion of the video stream of the physical environment, wherein the task list includes a plurality of task elements respectively associated with a plurality of tasks, wherein the plurality of task elements includes a first task element associated with a first task with a first text appearance and a second task element associated with a second task; and
   while displaying the task list overlaid on at least the portion of the video stream of the physical environment:
   determining whether the first task has been completed by analyzing the video stream of the physical environment to identify a user interaction with a physical object that is associated with completing the first task;
   changing an appearance of the first task element to a second text appearance different from the first text appearance within the task list in response to determining that the first task is in progress by analyzing the video stream to identify that a user is currently interacting with the physical object;
   changing an appearance of the first task element to a third text appearance different from the first and second text appearances within the task list in response to determining that the first task has been completed by analyzing the video stream to identify that the user interaction with the physical object has been completed; and
   maintaining the appearance of the first task element with the first text appearance within the task list in response to determining that the first task has not been completed by analyzing the video stream to identify that the user interaction with the physical object has not been completed.

2. The method of claim 1, further comprising detecting a trigger event, wherein displaying the task list is performed in response to detecting the trigger event.

3. The method of claim 2, wherein detecting the trigger event includes detecting that the device is at a particular location.

4. The method of claim 2, wherein detecting the trigger event includes detecting a particular object in the video stream of the physical environment.

5. The method of claim 2, wherein, in response to determining that the trigger event is a first trigger event, displaying the task list includes displaying a first task list including a first plurality of task elements and wherein, in response to determining that the trigger event is a second trigger event, displaying the task list includes displaying a second task list including a second plurality of task elements different than the first plurality of task elements.

6. The method of claim 1, wherein the plurality of tasks includes sending messages to a respective plurality of recipients.

7. The method of claim 1, further comprising changing a color of the first task element.

8. The method of claim 1, further comprising removing the first task element from the task list.

9. The method of claim 1, further comprising:
   detecting, in the video stream of the physical environment, that the second task is in progress;
   in response to detecting that the second task is in progress, changing display of the second task element;
   detecting, in the video stream of the physical environment, that the second task is no longer in progress and is not completed; and
   in response to detecting that the second task is in progress, reverting display of the second task element.

10. The method of claim 1, further comprising:
    detecting a user input directed to the second task element; and
    in response to detecting the user input directed to the second task element, changing display of the second task element.

11. The method of claim 1, further comprising:
    detecting a user input directed to the task list; and
    in response to detecting the user input directed to the task list, ceasing display of the task list.

12. The method of claim 1, wherein the first task is in progress when the physical object is being moved from a first location within the physical environment to a second location within the physical environment;
    wherein the first task is complete when an analysis of the video stream indicates that the physical object has been moved from the first location within the physical environment to the second location within the physical environment; and
    wherein the first task has not been completed when an analysis of the video stream indicates that the physical object has not been moved from the first location or the physical object has been returned to the first location.

13. A device comprising:
an image sensor;
a display;
a non-transitory memory; and
one or more processors to:
  obtain, using the image sensor, a video stream of a physical environment;
  display, via the display, at least a portion of the video stream of the physical environment; display a task list overlaid on at least the portion of the video stream of the physical environment, wherein the task list includes a plurality of task elements respectively associated with a plurality of tasks, wherein the plurality of task elements includes a first task element associated with a first task with a first text appearance and a second task element associated with a second task; and
  while displaying the task list overlaid on at least the portion of the video stream of the physical environment:
    determine whether the first task has been completed by analyzing the video stream of the physical environment to identify a user interaction with a physical object that is associated with completing the first task;
    change an appearance of the first task element to a second text appearance different from the first text appearance within the task list in response to determining that the first task is in progress by analyzing the video stream to identify that a user is currently interacting with the physical object;
    change an appearance of the first task element to a third text appearance different from the first and second text appearances within the task list in response to determining that the first task has been completed by analyzing the video stream to identify that the user interaction with the physical object has been completed; and
    maintain the appearance of the first task element with the first text appearance within the task list in response to determining that the first task has not been completed by analyzing the video stream to identify that the user interaction with the physical object has not been completed.

14. The device of claim 13, wherein the one or more processors are further to detect a trigger event and display the task list in response to detecting the trigger event, wherein the one or more processors are to detect the trigger event by detecting that the device is at a particular location or detecting a particular object in the video stream of the physical environment.

15. The device of claim 13, wherein the one or more processors are to change display of the first task element to the third text appearance by displaying a line through the first task element, changing a color of the first task element, moving the first task element in the task list, or removing the first task element from the task list.

16. The device of claim 13, wherein the one or more processors are further configured to detect a trigger event, wherein displaying the task list is performed in response to detecting the trigger event.

17. The device of claim 13, wherein the one or more processors are further configured to remove the first task element from the task list.

18. A non-transitory computer-readable medium having instructions encoded thereon which, when executed by one or more processors of a device including an image sensor and a display, cause the device to:
  obtain, using the image sensor, a video stream of a physical environment;
  display, via the display, at least a portion of the video stream of the physical environment;
  display a task list overlaid on at least the portion of the video stream of the physical environment, wherein the task list includes a plurality of task elements respectively associated with a plurality of tasks, wherein the plurality of task elements includes a first task element associated with a first task with a first text appearance and a second task element associated with a second task; and
  while displaying the task list overlaid on at least the portion of the video stream of the physical environment:
    determine whether the first task has been completed by analyzing the video stream of the physical environment to identify a user interaction with a physical object that is associated with completing the first task;
    change an appearance of the first task element to a second text appearance different from the first text appearance within the task list in response to determining that the first task is in progress by analyzing the video stream to identify that a user is currently interacting with the physical object;
    change an appearance of the first task element to a third text appearance different from the first and second text appearances within the task list in response to determining that the first task has been completed by analyzing the video stream to identify that the user interaction with the physical object has been completed; and
    maintain the appearance of the first task element with the first text appearance within the task list in response to determining that the first task has not been completed by analyzing the video stream to identify that the user interaction with the physical object has not been completed.

19. The non-transitory computer-readable medium of claim 18, wherein the one or more processors are to change display of the first task element to the third text appearance by displaying a line through the first task element, changing a color of the first task element, moving the first task element in the task list, or removing the first task element from the task list.

20. The non-transitory computer-readable medium of claim 18, wherein the instructions further cause the device to detect a trigger event, wherein displaying the task list is performed in response to detecting the trigger event.

21. The non-transitory computer-readable medium of claim 18, wherein the instructions further cause the device to move the first task element in the task list.

* * * * *